US010033550B2

United States Patent
Abdoli et al.

(10) Patent No.: US 10,033,550 B2
(45) Date of Patent: Jul. 24, 2018

(54) USER EQUIPMENT DETECTION FOR UPLINK RANDOM ACCESS IN DISPERSIVE FADING ENVIRONMENTS

(71) Applicants: Javad Abdoli, Kanata (CA); Ming Jia, Ottawa (CA)

(72) Inventors: Javad Abdoli, Kanata (CA); Ming Jia, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 15/076,128

(22) Filed: Mar. 21, 2016

(65) Prior Publication Data

US 2017/0272278 A1    Sep. 21, 2017

(51) Int. Cl.
| | | |
|---|---|---|
| *H04W 80/04* | (2009.01) | |
| *H04L 25/02* | (2006.01) | |
| *H04L 5/00* | (2006.01) | |
| *H04W 74/08* | (2009.01) | |

(52) U.S. Cl.
CPC ........ *H04L 25/0202* (2013.01); *H04L 5/0048* (2013.01); *H04W 74/0833* (2013.01)

(58) Field of Classification Search
CPC ..... H04W 80/04; H04W 72/04; H04W 24/00; H04W 88/02
See application file for complete search history.

(56) References Cited

U.S. PATENT DOCUMENTS

| | | | | |
|---|---|---|---|---|
| 2011/0261905 A1* | 10/2011 | Shental | ............... | H04L 25/0202 375/316 |
| 2012/0069914 A1* | 3/2012 | Shental | ............... | H04L 25/0248 375/259 |
| 2013/0128932 A1* | 5/2013 | Huang | .................. | H04L 5/0048 375/219 |
| 2013/0163645 A1* | 6/2013 | Kuo | ..................... | H04B 7/0478 375/219 |
| 2014/0140375 A1* | 5/2014 | Muqaibel | ........... | H04B 1/71637 375/146 |
| 2015/0208427 A1* | 7/2015 | Furudate | ............. | H04L 25/0212 370/329 |

(Continued)

OTHER PUBLICATIONS

Bayesteh, Alireza, et al. "Blind detection of SCMA for uplink grant-free multiple-access." Wireless Communications Systems (ISWCS), 2014 11th International Symposium on. IEEE, 2014.

*Primary Examiner* — Andrew Lee

(57) ABSTRACT

Systems and methods for detecting potentially active user equipment (UE) in a network are provided. A set of potentially active UEs is detected using an iterative method. In a first iteration UE detection is performed using compressed sensing (CS) based on first pilot sequences to detect a first set of potentially active UEs. Channel estimation is then performed for the first set of potentially active UEs. In subsequent iterations, UE detection is performed using CS to detect another set, typically reduced in size, of potentially active UEs using results of the channel estimation from the previous iteration. Channel estimation is then again performed for the new set of potentially active UEs. After the last iteration, the set of potentially active UEs detected in the last iteration is output as the determined set of potentially active UEs along with channel estimates for the set of potentially active UEs determined in last iteration.

20 Claims, 2 Drawing Sheets

(56) References Cited

U.S. PATENT DOCUMENTS

2016/0191126 A1\* 6/2016 Bose .................... H04B 7/0452
                                                        370/329
2016/0295596 A1\* 10/2016 Masmoudi ............... H04B 1/40
2017/0126437 A1\* 5/2017 Truong ................ H04B 7/0456

\* cited by examiner

USER EQUIPMENT DETECTION FOR UPLINK RANDOM ACCESS IN DISPERSIVE FADING ENVIRONMENTS

FIELD

The application relates to user equipment detection for uplink random access.

BACKGROUND

User equipment (UE) detection is an important ingredient of any uplink random access system. Compressed sensing (CS) is a tool for UE detection in scenarios where UE activity is sparse in the sense that from a large number of UEs that could attempt to access the system at a given instant, typically a relatively small number are in fact attempting to access the system. In other words, a small number of UEs among a large pool of UEs are simultaneously active.

A standard CS problem involves solving an underdetermined set of (noisy or noiseless) equations in terms of an unknown sparse vector based on a number of observations. The number of nonzero elements in the unknown vector is much less than the number of observations. The set of equations can be expressed as follows:

$$y_{M \times 1} = P_{M \times N} \cdot h_{N \times 1} + n_{M \times 1}$$

where the elements of the equation are:
$y_{M \times 1}$ = is a set of M observations;
$h_{N \times 1}$ is a set of N unknowns;
$P_{M \times N}$ is a matrix that defines linear combinations of the unknowns;
$n_{M \times 1}$ is a set of noise components.
with $K \ll M < N$, where K is the number of nonzero elements of h.

The CS problem is usually cast as an optimization problem. One typical example is the following convex optimization problem $$\hat{h} = \arg\min_h \frac{1}{2} \|y - Ph\|_2^2 + \lambda \|h\|_1$$

$\|\cdot\|_2$ and $\|\cdot\|_1$ denote $l_2$-norm and $l_1$-norm of a vector, respectively, defined as $$\|x\|_2 = \sqrt{\Sigma_i |x_i|^2} \text{ and } \|x\|_1 = \Sigma_i |x_i|$$

The UE detection problem can be recast as a CS problem based on the following set of equations:

$$y_{M \times 1} = P_{M \times N} \cdot h_{N \times 1} + n_{M \times 1}$$

where the elements of the equation are:
$y_{M \times 1}$ = is a set of M observations;
$h_{N \times 1}$ is a set of N unknowns representing the vector of channel coefficients of the UEs; each active UE corresponds to a nonzero element in h and each inactive UE corresponds to a zero element in h. It is noted that h is not the channel per se, but is a CS determined single value that represents a fixed channel over the entire pilot sequence; following CS detection, h is the CS detection output;
$P_{M \times N}$ is a pilot matrix;
$n_{M \times 1}$ is a set of noise components;
with $K \ll M < N$, where
K is the number of nonzero elements of h, which is equal to the number of UEs that are in fact active at a given instant;
N is the size of the pool of UEs that might be active;
M is the number of observations.

SUMMARY

According to one aspect of the present invention, there is provided a method for detecting potentially active user equipment (UE) in a network comprising: performing a first iteration comprising: performing UE detection using compressed sensing (CS) based on first pilot sequences to detect a first set of potentially active UEs; performing channel estimation for the first set of potentially active UEs; performing at least one subsequent iteration, each subsequent iteration comprising: performing UE detection using CS to detect a set of potentially active UEs using results of the channel estimation from the previous iteration; performing channel estimation for the set of potentially active UEs; and after a last iteration, outputting the set of potentially active UEs detected in the last iteration and outputting channel estimates for the set of potentially active UEs detected in the last iteration.

According to another aspect of the present invention, there is provided a receiver for detecting potentially active user equipment (UE) in a network, the receiver comprising: at least one antenna; a UE detector based on channel estimates (UEDBCE); a channel estimator; the receiver configured to perform a first iteration comprising: the UEDBCE performing UE detection using compressed sensing (CS) based on first pilot sequences to detect a first set of potentially active UEs; the channel estimator performing channel estimation for a first set of potentially active UEs; the receiver further configured to perform at least one subsequent iteration, each subsequent iteration comprising: the UEDBCE performing UE detection using CS to detect a set of potentially active UEs using results of the channel estimation from the previous iteration; the channel estimator performing channel estimation for the set of potentially active UEs; the receiver further configured to, after a last iteration, output the set of potentially active UEs detected in the last iteration and output channel estimates for the set of potentially active UEs detected in last iteration.

BRIEF DESCRIPTION OF THE DRAWINGS

Embodiments of the disclosure will now be described with reference to the attached drawings in which.

DETAILED DESCRIPTION

An assumption in the standard CS problem is that the unknowns are constant over a set of observations. Applied to the UE detection problem, this leads to an assumption that the channel between each UE and the base station is fixed over an entire pilot sequence, i.e. h has a single nonzero element for each active UE. Another feature of the standard application of CS to UE detection is that UE detection is performed separately from channel estimation.

The assumption that the channel between each UE and the base station is fixed over the entire pilot sequence is not necessarily true in dispersive fading environments due to frequency and/or time selectivity of UEs' uplink channels.

Systems and methods are provided that make use of an iterative approach to UE detection, in which the assumption is not made that the channel between the UE and the base station is fixed. In addition, UE detection and channel estimation are performed jointly rather than completely separately.

Figure 1:
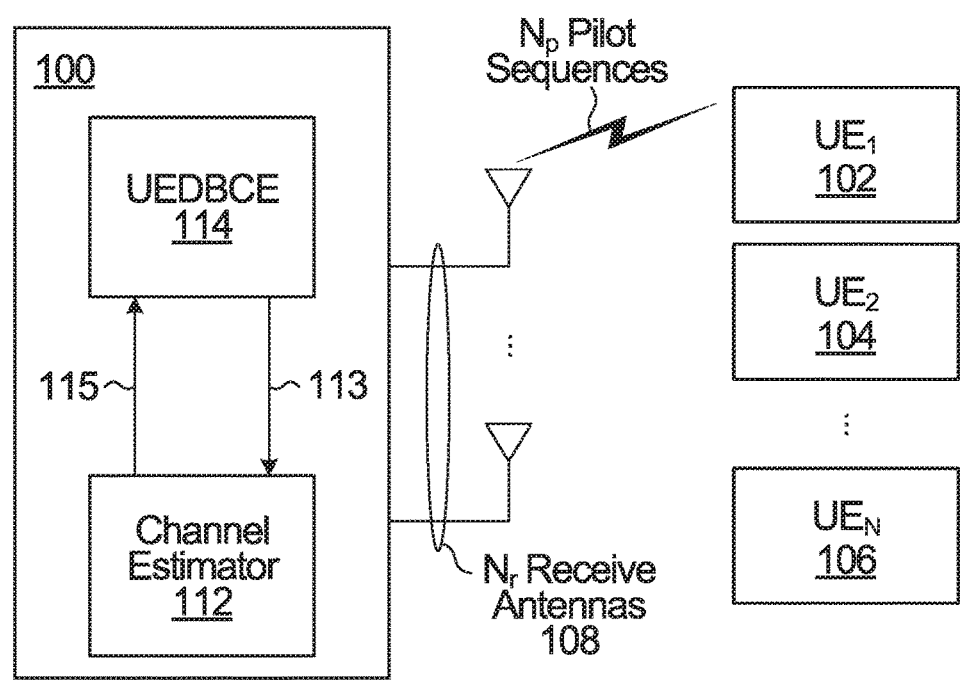
FIG. 1 is a block diagram of a system for performing UE detection based on channel estimates.

Referring now to FIG. 1, shown is a receiver with UE detection provided by an embodiment of the invention, generally indicated at 100. The receiver may, for example, be a wireless base station. It should be understood that the receiver is shown with components to perform UE detection, but that typically the receiver will include other functionality and components. Also shown is a set of UEs $UE_1$ 102, $UE_2$ 104, ..., $UE_N$ 106. More generally, the receiver 100 of FIG. 1 is configured to perform UE detection of active UEs within a pool of up to N UEs, but there may or may not be N UEs in the vicinity of the receiver 100 at a given instant. The receiver 100 has $N_r$ receive antennas 108, where $N_r >= 1$. The receiver 100 has a UE detector based on channel estimates (UEDBCE) 114 that performs UE detection based on channel estimates, as a function of signals received at the $N_r$ receive antennas 108. The receiver has a channel estimator 112 that performs channel estimation for UEs detected by the UEDBCE 114.

In operation, one or more of the UEs are active at a given time. Each active UE transmits a respective set of $N_p$ pilot sequences, where $N_p >= 1$. The receiver 100 does not know which UEs transmitted a pilot sequence, and as such initially all the UEs are potentially active. However, pilot sequences will only actually be transmitted by active UEs. The UEDBCE 114 and the channel estimator 112 together perform an iterative method of UE detection and channel estimation. During a first iteration, the UEDBCE 114 performs UE detection based on the pilot sequences transmitted by the active UEs to detect a first set of potentially active UEs. The detected first set is passed to the channel estimator 112 at 113. As detailed below, a compressed sensing approach is employed for UE detection. In some embodiments, the UEDBCE 114 combines the pilot sequences transmitted by the UEs with channel estimates to produce modified pilot sequences, and performs UE detection based on the modified pilot sequences. The channel estimator 112 performs channel estimation for the first set of potentially active UEs. The channel estimates are passed to the UEDBCE at 115. Then, in each of at least one subsequent iteration, the UEDBCE performs UE detection using compressed sensing to detect a set of potentially active UEs using results of the channel estimation from the previous iteration. The channel estimator 112 performs channel estimation for the new set of potentially active UEs. After the last iteration, the set of potentially active UEs detected in the last iteration is output as the determined set of potentially active UEs along with channel estimates for the set of potentially active UEs determined in last iteration. There may be a fixed number of subsequent iterations, or the method may continue until some other stopping condition is satisfied that is a function of CS detection.

Detailed example methods of performing UE detection and channel estimation that may be performed by the UEDBCE 11 and the channel estimator 112 will now be described.

In the following description, references are made to the following terms:
primary pilot matrices: the primary pilot matrices are defined by the actual pilot sequences transmitted by the N UEs, if they were all active. So long as the pilot sequences transmitted by the UEs are fixed, the primary pilot matrices do not change. In a specific example, each UE transmits $N_p$ pilot sequences of length M, and each pilot sequence occupies M OFDM tones, an OFDM tone being one OFDM subcarrier during one OFDM symbol. The M tones may occupy up to M different OFDM subcarriers. The subcarriers used for the pilot sequence may be spread across the frequency band used by the UE. The pilot sequence may also be spread out in time, with two or more of the M tones being in different OFDM symbols. A combination of both frequency and time spreading is also possible. The $N_p$ pilot sequences transmitted by a given UE may all be the same or they may be different. Where the receiver has N, receive antennas, there are L opportunities to observe pilot sequences transmitted by the UE, where $L=N_p \times N_r$, and as such there are L pilot matrices for the UEs collectively, each pilot matrix containing a column for each UE.

secondary pilot matrices: the secondary pilot matrices contain modified pilot sequences generated from the primary pilot sequences and the channel estimates using a transformation such as described below by way of example, although for the first iteration, the secondary pilot matrices are set equal to the primary pilot matrices;

$j_{max}$ is a parameter defining the maximum number of iterations;

the sequence $K_1, \ldots, K_{jmax}$ is a non-increasing sequence that defines how many UEs are kept in each iteration.

In defining the sequence $K_1, \ldots, K_{jmax}$, in some embodiments $K_i$ satisfies $K_i > K$. In some embodiments, $K_1$ is set to be significantly larger than K in the first iteration so as not to exclude any active UEs for the channel estimation. However, setting $K_1$ to be very large relative to K may have an effect on channel estimation quality.

As iterations go on, $K_i$ can be reduced because the performance of compressed sensing is expected to improve, and as such there is not a need to keep a large list of potentially active UEs at the output of the compressed sensing.

Moreover, for the number of active UEs K, the receiver could either use a priori knowledge of K or estimate the value of K (and update its estimate) using the output of compressed sensing in each iteration.

The method of UE detection involves initialization, a first iteration, and at least one subsequent iteration. For each iteration, the steps of UE detection, channel estimation, and secondary pilot matrix update are performed.

Initialization:

Set j=iteration counter=1

Set the secondary pilot matrices equal to the primary pilot matrices:

$$P'_l = P_l = [p_{l,1}, \ldots, p_{l,N}], \forall l \in \{1, \ldots, L\}$$

Where $p_{l,k}$ is a vector of length M representing the pilot sequence transmitted by user k, for observation l of the L observation opportunities. For example, in a system with two receive antennas (antenna 1 and antenna 2), and two pilot sequences (pilot sequence 1 and pilot sequence 2) transmitted by a UE, the l could be incremented according to:

l=1: antenna 1, pilotsequence 1 l=2: antenna 2, pilot sequence 1 l=3: antenna 1, pilot sequence 2 l=4: antenna 2, pilot sequence 2

Set the values of $j_{max}$ and the sequence $K_1, \ldots, K_{jmax}$

UE Detection

UE detection is performed with compressed sensing using the secondary pilot matrices (I.e. using primary pilot matrices for the first iteration and modified pilot sequences for subsequent iterations) $P'_1, \ldots, P'_L$:

$$y_{M \times 1}[l] = P'_l \cdot h_{N \times 1}[l] + n_{M \times 1}[l], \forall l \in \{1, \ldots, L\}$$

M: Measurement length=length of pilot sequence
L: Number of measurements
N: Pilot pool size (UE pool size)

An example setting for multicarrier uplink, such as OFDM:

M: Length of the pilot sequence=number of pilot subcarriers

L: $N_p$=number of pilot sequence transmissions (number of times the pilot sequence is transmitted)×$N_r$=number of receive antennas.

UE detection using compressed sensing can involve solving the previously referenced convex optimization problem. However, it should be understood that the specified convex optimization problem is just one setup to address the CS problem. Other approaches and setups may alternatively be employed. Examples of techniques to solve the compressed sensing problem include the following algorithms (and their block versions for the case of L>1): Orthogonal Matching Pursuit (OMP), Coordinate Descent (CD), Approximate Message Passing (AMP).

The output of CS detection for the first iteration is an estimate of a vector $h_{N \times 1}$ containing a respective detected signal for each UE.

The UEs are then sorted in decreasing order of the norms of their corresponding detected signal at the output of CS detection. The first $K_j$ UEs are selected as the set of potentially active UEs.

Channel Estimation

The uplink channels of the $K_j$ potentially active UEs are estimated by applying a known channel estimation algorithm on their corresponding pilot sequences from the primary pilot matrices $P_1, \ldots, P_L$. The sequence $K_1, \ldots, K_{jmax}$ is a non-increasing sequence of numbers, such that the number of potentially active UEs in each iteration is held the same or decreased. It is noted that the quality of the channel estimates can be expected to improve as the number of potentially active UEs decreases. Examples of channel estimation algorithms that can be applied include frequency domain MMSE-based and time domain MMSE-based channel estimations, but other approaches can be used and the methods described herein are not limited to a specific approach to channel estimation. The channel estimates are defined as:

$$\hat{h}_{l,k}, \forall l \in \{1, \ldots L\}, k \in \{k_1, \ldots, k_{K_j}\}$$

For each UE in the current set of potentially active UEs, there is a respective channel estimate for each of the L measurements.

Secondary Pilot Matrix Update

Next, the secondary pilot matrix is updated. More specifically, the secondary pilot sequences corresponding to the $K_j$ potentially active UEs are updated as a function of the primary pilot sequences, and the channel estimates. In a specific example, this is done using Hadamard multiplication, also known as element-wise multiplication.

$$p'_{l,k} = p_{l,k} \circ \hat{h}_{l,k}, \forall l \in \{1, \ldots, L\}, k \in \{k_1, \ldots, k_{K_j}\}$$

followed by pilot normalization to ensure power is the same as original pilot power:

$$p'_{l,k} = p'_{l,k} \times \frac{\|p_{l,k}\|_2}{\|p'_{l,k}\|_2}, \forall l \in \{1, \ldots, L\}, k \in \{k_1, \ldots, k_{K_j}\}$$

After UE detection, channel estimation and secondary pilot update, j is incremented. If $j \leq j_{max}$, then the method returns to the step of UE detection using compressed sensing. In subsequent iterations (iterations other than the first iteration), compressed sensing is performed using the secondary pilot sequences which are a function of both the primary pilot sequences and the channel estimates. Otherwise, $j > j_{max}$, and the list of $K_{jmax}$ potentially active UEs is output together with their estimated channel coefficients.

In the example described, $j_{max}$ iterations are performed. In this case, the number of iterations is set a priori. In another embodiment, the receiver can stop the iterations once some UE detection performance criterion is met. As an example of the latter approach, the receiver can sort UEs in order according to the output of compressed sensing and determine if there is a drop in the CS detection output between a pair of consecutive UEs in the sorted list that is greater than a predefined threshold. When there is such a drop then the iterations can stop.

The approach introduced above can be used to estimate the value of K, if it is not known a priori. More specifically, the receiver can set a threshold. Then, if there is drop in the CS detection output within a sorted list that is larger than a threshold, the number of UEs from the first UE in the sorted list up to the UE after which the drop happens can be considered as an estimate of the number of active UEs. This estimate can be updated iteration by iteration.

In some embodiments, a predefined cap (maximum) on the number of active UEs can be set by the system. Then, the minimum of this cap and the threshold-based estimated K can be used as the number of active UEs.

In some embodiments, $K_{jmax}$ is set to be greater than the expected number of active users, and a decoding process is used to make a final decision on the number of active users. For example, in some embodiments, the $K_{jmax}$ is set to be at least two times the known or estimated number of actual users.

Figure 2:
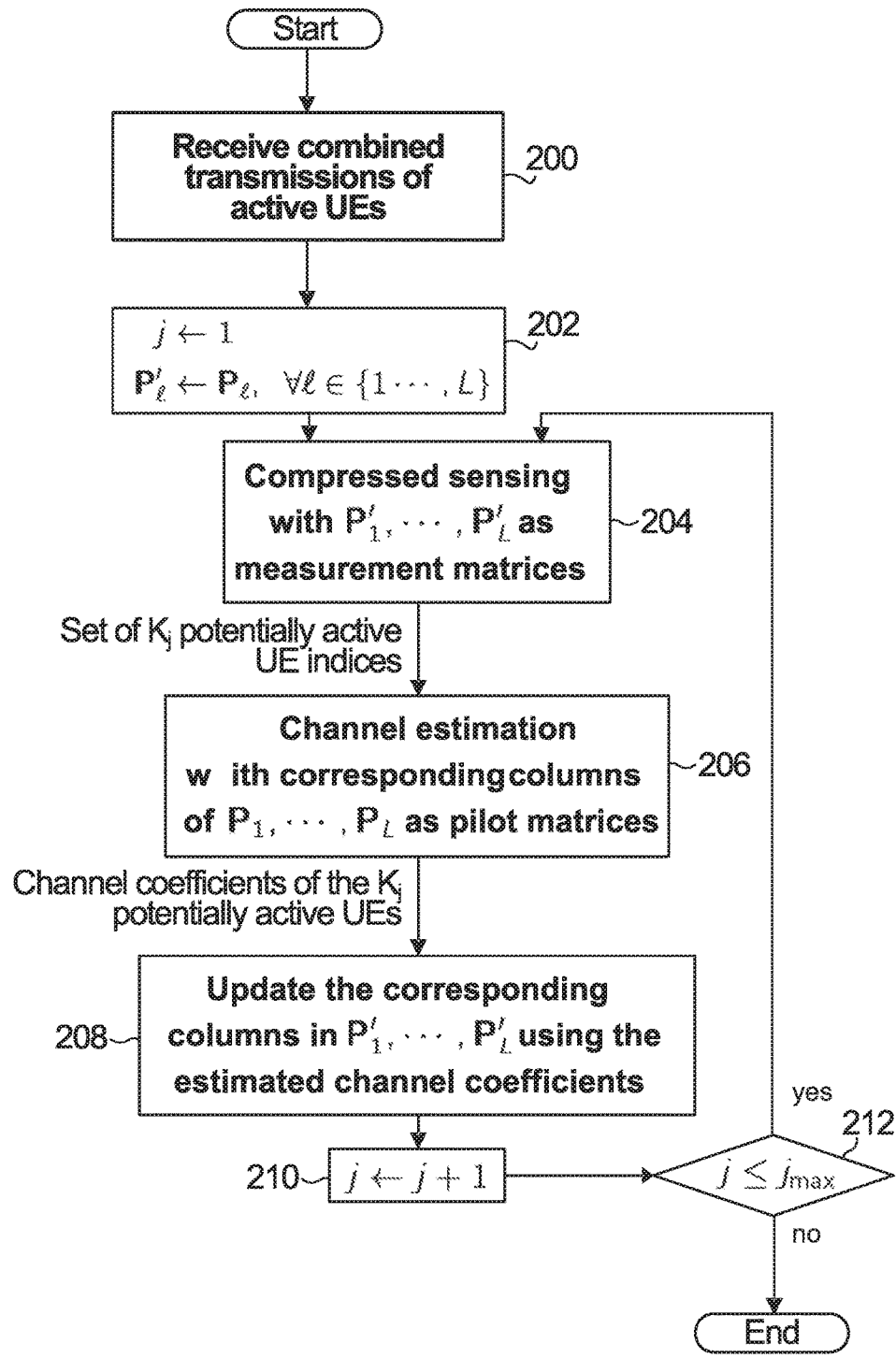
FIG. 2 is a flowchart of a method of performing UE detection based on channel estimates.

The method of UE detection is summarized in FIG. 2. The base station performs the method steps 200 to 212 to detect a set of UEs. In block 200, the base station receives combined transmissions of a set of active UEs over the air. In block 202, the counter j is initialized to one, and a set of secondary pilot sequences is initialized to the primary pilot sequences of all the UEs. In block 204, compressed sensing is performed using the secondary pilot sequences. The output is a set of $K_j$ potentially active UE indices. In block 204, channel estimation is performed with the corresponding columns of the primary pilot sequences as pilot matrices. The output is a set of channel coefficients of the $K_j$ potentially active UEs. In block 208, the set of secondary pilot sequences is updated using the estimated channel coefficients. The counter j is incremented in block 210. If the counter $j <= j_{max}$ in block 212, then the method continues with another iteration by returning to block 204. Otherwise, the method ends.

The described UE detection algorithm is based on iterative CS/channel estimation so as to make a fading channel effectively flat over the pilot sequence. More specifically, the secondary pilot sequences are obtained by absorbing the channel changes into the actual (primary) pilot sequences. This is done via the Hadamard multiplication operation.

Therefore, the impact of channel over the secondary pilot sequences is now flat (or constant over the pilot sequence).

For the purpose of illustrating the application of the described approach an example simulation will be described. The following simulation setup was employed:
Pool size: 200
Pilot generation: random phase
Pilot arrangement: Frequency domain
Pilot length per pilot sequence: 50
number of active UEs: 12 ($UE_1, \ldots, UE_{12}$)
number of pilot sequence transmissions per UE: 2
Antenna arrangement: 1×2
Channel: Exponential multi-tap fading
SNR: 30 db
CS algorithm: Generalized block coordinate descent (BCD)
number of CS iterations: 100
Channel estimation algorithm: Time domain MMSE
$j_{max}$ (i.e. # of detection-estimation iterations): 3
($K_1, K_2, K_3$): (72, 24, 24)

The simulation results show the results after two iterations for 10 different trials. For each iteration of each trial, shown are the ranks of the 12 active UEs, i.e. $UE_1, \ldots, UE_{12}$, in the sorted list of the output of compressed sensing. In this example, the receiver finally outputs the 12 UEs from the top of the sorted list as detected UEs. A number between 1 and 12 represents a correct detection and a number larger than 12 represents an error. When the number for the first iteration is bold, that means there is an error. For example, in the first trial, first iteration, $UE_8$, $UE_9$, and $UE_{12}$ are ranked as $14^{th}$, $16^{th}$, $13^{th}$, and therefore, are missed if the detection is finalized after the first iteration. The rankings of $UE_8$, $UE_9$, and $UE_{12}$ for the second iteration are also bolded for comparison purposes. It can be seen that for the simulation parameters used, after two iterations, most errors have been removed.

Numerous modifications and variations of the present disclosure are possible in light of the above teachings. It is therefore to be understood that within the scope of the appended claims, the disclosure may be practiced otherwise than as specifically described herein.

The invention claimed is:

1. A method for detecting potentially active user equipment (UE) in a network comprising:
performing a first iteration comprising:
performing UE detection using compressed sensing (CS) based on first pilot sequences to detect a first set of potentially active UEs; and
performing channel estimation for the first set of potentially active UEs;
performing at least one subsequent iteration, each subsequent iteration comprising:
performing UE detection using CS to detect a set of potentially active UEs using results of the channel estimation from the previous iteration; and
performing channel estimation for the set of potentially active UEs; and
after a last iteration, outputting the set of potentially active UEs detected in the last iteration and outputting channel estimates for the set of potentially active UEs detected in the last iteration;
wherein for at least one iteration, the set of potentially active UEs detected in that iteration is smaller than the set of potentially active UEs detected in the previous iteration.

| Trial # | Iteration # | Ranks of active UEs in the sorted output of CS ||||||||||||
|---|---|---|---|---|---|---|---|---|---|---|---|---|---|
| | | $UE_1$ | $UE_2$ | $UE_3$ | $UE_4$ | $UE_5$ | $UE_6$ | $UE_7$ | $UE_8$ | $UE_9$ | $UE_{10}$ | $UE_{11}$ | $UE_{12}$ |
| 1 | 1 | 2 | 4 | 1 | 5 | 10 | 8 | 6 | 14 | 16 | 3 | 7 | 13 |
| | 2 | 2 | 4 | 1 | 5 | 12 | 7 | 6 | 10 | 8 | 3 | 9 | 11 |
| 2 | 1 | 2 | 10 | 8 | 5 | 1 | 7 | 3 | 46 | 4 | 9 | 6 | 12 |
| | 2 | 2 | 10 | 11 | 7 | 1 | 6 | 4 | 12 | 5 | 8 | 3 | 9 |
| 3 | 1 | 2 | 5 | 4 | 9 | 14 | 21 | 7 | 1 | 3 | 6 | 52 | 8 |
| | 2 | 3 | 9 | 2 | 7 | 13 | 10 | 5 | 1 | 4 | 6 | 12 | 8 |
| 4 | 1 | 12 | 3 | 2 | 10 | 11 | 8 | 6 | 5 | 1 | 7 | 4 | 9 |
| | 2 | 10 | 4 | 2 | 12 | 11 | 9 | 6 | 5 | 1 | 8 | 3 | 7 |
| 5 | 1 | 7 | 5 | 8 | 15 | 4 | 3 | 6 | 1 | 11 | 2 | 9 | 10 |
| | 2 | 6 | 5 | 7 | 12 | 8 | 4 | 3 | 1 | 11 | 2 | 9 | 10 |
| 6 | 1 | 8 | 9 | 3 | 14 | 6 | 7 | 25 | 1 | 5 | 2 | 13 | 4 |
| | 2 | 8 | 7 | 4 | 11 | 6 | 9 | 13 | 1 | 5 | 3 | 10 | 2 |
| 7 | 1 | 10 | 2 | 3 | 4 | 8 | 5 | 13 | 6 | 7 | 1 | 11 | 9 |
| | 2 | 10 | 8 | 3 | 2 | 4 | 7 | 12 | 5 | 6 | 1 | 11 | 9 |
| 8 | 1 | 4 | 9 | 12 | 11 | 1 | 5 | 2 | 3 | 8 | 10 | 6 | 7 |
| | 2 | 5 | 12 | 10 | 7 | 2 | 4 | 3 | 1 | 8 | 9 | 6 | 11 |
| 9 | 1 | 11 | 12 | 6 | 8 | 4 | 9 | 3 | 7 | 2 | 10 | 1 | 5 |
| | 2 | 10 | 12 | 6 | 7 | 4 | 9 | 2 | 8 | 5 | 11 | 1 | 3 |
| 10 | 1 | 2 | 5 | 16 | 4 | 9 | 7 | 8 | 13 | 12 | 3 | 6 | 1 |
| | 2 | 3 | 5 | 12 | 2 | 8 | 9 | 7 | 11 | 10 | 4 | 6 | 1 |

The error rate after the first, second and third iteration is summarized as follows:

| | After 1$^{st}$ iteration | After 2$^{nd}$ iteration | After 3$^{rd}$ iteration |
|---|---|---|---|
| Detection Error Rate | 28.9% | 7.3% | 7.3% |

2. The method of claim 1 wherein the at least one subsequent iteration is a predetermined number of subsequent iterations.

3. The method of claim 1 wherein performing the at least one subsequent iteration comprises performing subsequent iterations until a UE detection performance criterion is met.

4. The method of claim 1 wherein:
the first iteration further comprises generating modified pilot sequences for the first set of potentially active UEs based on the first pilot sequences of the UEs of the first set of potentially active UEs and the channel estimate for each UE of the first set of potentially active UEs;
wherein for each subsequent iteration:
performing UE detection using CS comprises using CS in combination with the modified pilot sequences generated in the previous iteration for the set of potentially active UEs generated in the previous iteration to generate the set of potentially active UEs;
performing channel estimation comprises generating a channel estimate for each UE of the set of potentially active UEs based on the first pilot sequences of the set of potentially active UEs;
the subsequent iteration further comprising generating modified pilot sequences for the set of potentially active UEs based on the first pilot sequences of the UEs of the set of potentially active UEs and the channel estimate for each UE of the set of potentially active UEs.

5. The method of claim 4 wherein:
in the first iteration, generating modified pilot sequences for the first set of potentially active UEs based on the first pilot sequences of the UEs of the first set of potentially active UEs and the channel estimate for each UE of the first set of potentially active UEs comprises:
using Hadamard multiplication to multiply the first pilot sequences of the UEs of the first set of potentially active UEs by the channel estimates of the first set of potentially active UEs and then normalizing a result of the Hadamard multiplication; and
in each subsequent iteration generating modified pilot sequences for the set of potentially active UEs based on the first pilot sequences of the UEs of the set of potentially active UEs and the channel estimate for each UE of the set of potentially active UEs comprises:
using Hadamard multiplication to multiply the first pilot sequences of the UEs of the set of potentially active UEs by the channel estimates of the set of potentially active UEs and then normalizing a result of the Hadamard multiplication.

6. The method of claim 4 wherein the first pilot sequences and the modified pilot sequences generated in each iteration each comprise a set of pilot matrices, wherein a number (L) of matrices in the set of pilot matrices is defined by a number of pilot sequences transmitted by each UE multiplied by a number of receive antennas of a device receiving the pilot sequences.

7. The method of claim 4 wherein using CS in combination with first pilot sequences, and using CS in combination with the modified pilot sequences, comprises using CS to solve the equation:

$$y_{M\times 1}^{[l]} = P'_l \times h_{N\times 1}^{[l]} + n_{M\times 1}^{[l]} \; \forall l \in \{1, \ldots, L\},$$

wherein y is the received signal, P' is a matrix containing the first pilot sequences or the modified pilot sequences, h is a channel estimate, M is a measurement length, L is a number of measurements and N is a total number of UEs.

8. The method of claim 4 wherein performing CS to generate each set of potentially active UEs comprises, for a set of UEs with a detectable signal after CS detection, selecting a predetermined number of UEs of the set of UEs with a detectable signal after CS detection as the set of potentially active UEs.

9. The method of claim 8 wherein selecting the predetermined number of UEs of the set of UEs with a detectable signal after CS detection as the set of potentially active UEs comprises:
selecting the predetermined number of UEs having the greatest norms of detected signals output from CS detection.

10. The method of claim 8 further comprising at least one of:
using a first smaller predetermined number after the first iteration; and
using a second smaller predetermined number after at least one subsequent iteration, the second smaller predetermined number being smaller than the first smaller predetermined number.

11. The method of claim 10 wherein a smallest predetermined number used in any iteration is set to be greater than an expected number of active users, the method further comprising employing a decoding process to select a subset of potentially active users from the set of potentially active users determined in the last iteration.

12. A receiver for detecting potentially active user equipment (UE) in a network, the receiver comprising:
at least one antenna;
a UE detector based on channel estimates (UEDBCE);
a channel estimator;
the receiver configured to perform a first iteration comprising:
the UEDBCE performing UE detection using compressed sensing (CS) based on first pilot sequences to detect a first set of potentially active UEs;
the channel estimator performing channel estimation for a first set of potentially active UEs;
the receiver further configured to perform at least one subsequent iteration, each subsequent iteration comprising:
the UEDBCE performing UE detection using CS to detect a set of potentially active UEs using results of the channel estimation from the previous iteration;
the channel estimator performing channel estimation for the set of potentially active UEs;
the receiver further configured to, after a last iteration, output the set of potentially active UEs detected in the last iteration and output channel estimates for the set of potentially active UEs detected in last iteration;
wherein for at least one iteration, the set of potentially active UEs detected in that iteration is smaller than the set of potentially active UEs detected in the previous iteration.

13. The receiver of claim 12 wherein:
in the first iteration, generating modified pilot sequences for the first set of potentially active UEs based on the first pilot sequences of the UEs of the first set of potentially active UEs and the channel estimate for each UE of the first set of potentially active UEs comprises:
using Hadamard multiplication to multiply the first pilot sequences of the UEs of the first set of potentially active UEs by the channel estimates of the first set of potentially active UEs and then normalizing a result of the Hadamard multiplication; and
in each subsequent iteration generating modified pilot sequences for the set of potentially active UEs based on the first pilot sequences of the UEs of the set of potentially active UEs and the channel estimate for each UE of the set of potentially active UEs comprises:

using Hadamard multiplication to multiply the first pilot sequences of the UEs of the set of potentially active UEs by the channel estimates of the set of potentially active UEs and then normalizing a result of the Hadamard multiplication.

14. The receiver of claim 12 wherein the at least one subsequent iteration is a predetermined number of subsequent iterations.

15. The receiver of claim 12 wherein:
the first iteration further comprises generating modified pilot sequences for the first set of potentially active UEs based on the first pilot sequences of the UEs of the first set of potentially active UEs and the channel estimate for each UE of the first set of potentially active UEs;
for each subsequent iteration:
the UEDBCE performing UE detection using CS comprises using CS in combination with the modified pilot sequences generated in the previous iteration for the set of potentially active UEs generated in the previous iteration to generate the set of potentially active UEs;
the channel estimator performing channel estimation comprises generating a channel estimate for each UE of the set of potentially active UEs based on the first pilot sequences of the set of potentially active UEs;
the UEDBCE generating modified pilot sequences for the set of potentially active UEs based on the first pilot sequences of the UEs of the set of potentially active UEs and the channel estimate for each UE of the set of potentially active UEs.

16. The receiver of claim 15 wherein the first pilot sequences and the modified pilot sequences generated in each iteration each comprise a set of pilot matrices, wherein a number (L) of matrices in the set of pilot matrices is defined by a number of pilot sequences transmitted by the UE multiplied by a number of receive antennas of the receiver.

17. The receiver of claim 15 wherein using CS to generate each set of potentially active UEs comprises, for a set of UEs with a detectable signal after CS detection, selecting a predetermined number of UEs of the set of UEs with a detectable signal after CS detection as the set of potentially active UEs.

18. The receiver of claim 17 wherein selecting the predetermined number of UEs of the set of UEs with a detectable signal after CS detection as the set of potentially active UEs comprises:
selecting the predetermined number of UEs having the greatest norms of detected signals output from CS detection.

19. The receiver of claim 17 further configured to at least one of:
use a first smaller predetermined number after the first iteration; and
use a second smaller predetermined number after each of at least one subsequent iteration, the second smaller predetermined number being smaller than the first smaller predetermined number.

20. The receiver of claim 19 wherein a smallest predetermined number used in any iteration is set to be greater than an expected number of active users, the method further comprising employing a decoding process to select a subset of potentially active users from the set of potentially active users determined in the last iteration.

* * * * *